US011165787B2

(12) United States Patent
Sloane et al.

(10) Patent No.: US 11,165,787 B2
(45) Date of Patent: Nov. 2, 2021

(54) SYSTEM FOR AUTHORIZATION OF ELECTRONIC DATA ACCESS AND PROCESSING FUNCTIONS WITHIN A DISTRIBUTED SERVER NETWORK

(71) Applicant: Bank of America Corporation, Charlotte, NC (US)

(72) Inventors: Brandon Sloane, Santa Barbara, CA (US); Lydia Lambright, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 304 days.

(21) Appl. No.: 16/550,764

(22) Filed: Aug. 26, 2019

(65) Prior Publication Data

US 2021/0067518 A1    Mar. 4, 2021

(51) Int. Cl.
*H04L 29/06* (2006.01)
(52) U.S. Cl.
CPC .................. *H04L 63/105* (2013.01)
(58) Field of Classification Search
CPC .................................................. H04L 63/105
See application file for complete search history.

(56) References Cited

U.S. PATENT DOCUMENTS

| 7,308,704 B2 | 12/2007 | Vogel et al. |
| 7,451,477 B2 | 11/2008 | Griffin et al. |
| 8,132,231 B2 | 3/2012 | Amies et al. |
| 8,196,184 B2 | 6/2012 | Amirov et al. |
| 8,225,416 B2 | 7/2012 | Richards et al. |
| 8,490,152 B2 | 7/2013 | Staiman et al. |
| 8,763,069 B2 | 6/2014 | Renfro et al. |
| 9,189,644 B2 | 11/2015 | Kling et al. |
| 9,483,488 B2 | 11/2016 | Kling et al. |
| 9,495,380 B2 | 11/2016 | Kling et al. |
| 9,558,334 B2 | 1/2017 | Kling et al. |
| 9,584,525 B2 | 2/2017 | Baikalov et al. |
| 9,602,517 B2 | 3/2017 | Connor et al. |
| 9,684,793 B2 | 6/2017 | Schlesinger et al. |
| 10,075,298 B2 | 9/2018 | Struttmann |

(Continued)

OTHER PUBLICATIONS

Gery Menegaz for Between the Lines Jun. 2, 2012, Enterprise Entitlements Management: Moving Beyond Authentication; retrieved Aug. 16, 2019 from http://www.zdnet.com/article/enterprise-entitlements-management-moving-beyond-authentication, 14 pages.

*Primary Examiner* — Shin-Hon (Eric) Chen
(74) *Attorney, Agent, or Firm* — Michael A. Springs; Moore & Van Allen PLLC; Seongun M. Hong

(57) ABSTRACT

A system provides for authorization of data access and processing functions within a distributed server network using a delegated proof-of-stake consensus mechanism. In particular, the system may use assign authorization levels to each node within the network environment. Certain actions or processes performed within the network (e.g., potentially damaging actions) may require that the node proposing the action meets a threshold authorization level before authorizing the action. The system may further increase or decrease authorization levels for each node depending on the outcomes of the proposed actions. In this way, the system may provide a secure way to authorize certain actions or processes taken within a computing environment.

2 Claims, 3 Drawing Sheets

(56) References Cited

U.S. PATENT DOCUMENTS

| | | | |
|---|---|---|---|
| 10,291,627 B2 | 5/2019 | Gleichauf | |
| 2016/0094551 A1* | 3/2016 | Sugihara | H04L 63/1466 726/7 |
| 2018/0053158 A1* | 2/2018 | White | G06Q 20/227 |
| 2018/0101560 A1* | 4/2018 | Christidis | H04L 9/3236 |
| 2018/0300382 A1 | 10/2018 | Madisetti et al. | |
| 2018/0337769 A1 | 11/2018 | Gleichauf | |
| 2019/0123892 A1 | 4/2019 | Basu | |
| 2019/0124146 A1* | 4/2019 | Austin | H04L 9/3236 |
| 2019/0236716 A1 | 8/2019 | Kasper et al. | |
| 2019/0289068 A1 | 9/2019 | Ma et al. | |
| 2019/0334886 A1* | 10/2019 | Lelcuk | G06Q 20/0658 |
| 2019/0394023 A1* | 12/2019 | Menon | H04L 9/3242 |
| 2020/0067696 A1* | 2/2020 | Sarin | G06F 16/2465 |
| 2020/0076574 A1* | 3/2020 | Austin | H04L 9/0637 |
| 2020/0118073 A1* | 4/2020 | Phillips | G06Q 20/3829 |
| 2020/0311734 A1* | 10/2020 | Mardikar | G06Q 20/3829 |
| 2020/0402168 A1* | 12/2020 | Johnson | G06Q 40/04 |
| 2021/0012278 A1* | 1/2021 | Alon | G06F 21/64 |
| 2021/0036860 A1* | 2/2021 | Ranganathan | H04L 9/3234 |
| 2021/0064780 A1* | 3/2021 | Riedel | G06Q 20/3674 |
| 2021/0160056 A1* | 5/2021 | Yan | G06F 21/602 |

* cited by examiner

ALLOCATE ONE OR MORE AUTHORIZATION TOKENS TO ONE OR MORE NODES OF THE DISTRIBUTED LEDGER
301

DETERMINE, BASED ON THE ONE OR MORE AUTHORIZATION TOKENS, AN AUTHORIZATION LEVEL FOR EACH OF THE ONE OR MORE NODES OF THE DISTRIBUTED LEDGER
302

RECEIVE, FROM A SUBMITTER NODE, AN ACCESS REQUEST FOR THE DISTRIBUTED LEDGER
303

BASED ON AN AUTHORIZATION LEVEL OF THE SUBMITTER NODE AND/OR AN AUTHORIZATION LEVEL OF ONE OR MORE VALIDATOR NODES, VALIDATE THE ACCESS REQUEST VIA THE VALIDATOR NODES
304

BASED ON VALIDATING THE ACCESS REQUEST, RESOLVE THE ACCESS REQUEST
305

FIG. 3

SYSTEM FOR AUTHORIZATION OF ELECTRONIC DATA ACCESS AND PROCESSING FUNCTIONS WITHIN A DISTRIBUTED SERVER NETWORK

FIELD OF THE INVENTION

The present disclosure embraces a system for authorization of electronic data access and processing functions within a distributed server network.

BACKGROUND

Conventional systems and methods for authorizing data access and other processes face a number of technological challenges. For instance, existing authorization methods may be vulnerable to security threats. Accordingly, there is a need for a more stable and secure way to perform authorization of processing functions within the networked environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for authorization of electronic data access and processing functions within a distributed server network. In particular, the system may use assign authorization levels to each node within the network environment. Certain actions or processes performed within the network (e.g., potentially damaging actions) may require that the node proposing the action meets a threshold authorization level before authorizing the action. The system may further increase or decrease authorization levels for each node depending on the outcomes of the proposed actions. In this way, the system may provide a secure way to authorize certain actions or processes taken within a computing environment.

Accordingly, embodiments of the present disclosure provide a system for authorization of data access and processing functions within a distributed server network. The system may comprise a memory device with computer-readable program code stored thereon; a communication device; and a processing device operatively coupled to the memory device and the communication device. The processing device may be configured to execute the computer-readable program code to allocate one or more authorization tokens to one or more nodes of the distributed ledger; determine, based on the one or more authorization tokens, an authorization level for each of the one or more nodes of the distributed ledger; receive, from a submitter node, an access request for the distributed ledger; based on an authorization level of the submitter node or an authorization level of one or more validator nodes, validate the access request via the validator nodes; and based on validating the access request, resolve the access request.

In some embodiments, the computer-readable program code further causes the processing device to detect that the access request is valid; and based on detecting that the access request is valid, allocate an additional set of authorization tokens to the submitter node.

In some embodiments, the computer-readable program code further causes the processing device to detect that the one or more validator nodes have properly validated the access request; and based on detecting that the one or more validator nodes have properly validated the access request, allocate an additional set of authorization tokens to the one or more validator nodes.

In some embodiments, the computer-readable program code further causes the processing device to detect that the access request is invalid; and based on detecting that the access request is invalid, deallocate the one or more authorization tokens from the submitter node.

In some embodiments, the computer-readable program code further causes the processing device to detect that the one or more validator nodes have improperly validated the access request; and based on detecting that the one or more validator nodes have properly validated the access request, deallocate the one or more authorization tokens to the one or more validator nodes.

In some embodiments, validating the access request via the validator nodes comprises using a delegated proof-of-stake consensus algorithm.

In some embodiments, validating the access request via the validator nodes comprises detecting that the authorization level of the submitter node is above a defined threshold; and granting the access request.

In some embodiments, validating the access request via the validator nodes comprises detecting that the authorization levels of the one or more validator nodes are above a defined threshold; and granting the access request.

In some embodiments, validating the access request via the validator nodes comprises detecting that the authorization level of the submitter node is below a defined threshold; and rejecting the access request.

In some embodiments, validating the access request via the validator nodes comprises detecting that the authorization levels of the one or more validator nodes are below a defined threshold; and rejecting the access request.

Embodiments of the present disclosure also provide a computer program product for authorization of data access and processing functions within a distributed server network. The computer program product may comprise at least one non-transitory computer readable medium having computer-readable program code portions embodied therein, the computer-readable program code portions comprising executable code portions for allocating one or more authorization tokens to one or more nodes of the distributed ledger; determining, based on the one or more authorization tokens, an authorization level for each of the one or more nodes of the distributed ledger; receiving, from a submitter node, an access request for the distributed ledger; based on an authorization level of the submitter node or an authorization level of one or more validator nodes, validating the access request via the validator nodes; and based on validating the access request, resolving the access request.

In some embodiments, the computer-readable program code portions further comprise executable code portions for detecting that the access request is valid; and based on detecting that the access request is valid, allocating an additional set of authorization tokens to the submitter node.

In some embodiments, the computer-readable program code portions further comprise executable code portions for detecting that the one or more validator nodes have properly validated the access request; and based on detecting that the one or more validator nodes have properly validated the access request, allocating an additional set of authorization tokens to the one or more validator nodes.

In some embodiments, validating the access request via the validator nodes comprises detecting that the authorization level of the submitter node is above a defined threshold; and granting the access request.

In some embodiments, validating the access request via the validator nodes comprises detecting that the authorization levels of the one or more validator nodes are above a defined threshold; and granting the access request.

Embodiments of the present disclosure also provide a computer-implemented for authorization of data access and processing functions within a distributed server network. The method may comprise allocating one or more authorization tokens to one or more nodes of the distributed ledger; determining, based on the one or more authorization tokens, an authorization level for each of the one or more nodes of the distributed ledger; receiving, from a submitter node, an access request for the distributed ledger; based on an authorization level of the submitter node or an authorization level of one or more validator nodes, validating the access request via the validator nodes; and based on validating the access request, resolving the access request.

In some embodiments, the method further comprises detecting that the access request is valid; and based on detecting that the access request is valid, allocating an additional set of authorization tokens to the submitter node.

In some embodiments, the method further comprises detecting that the one or more validator nodes have properly validated the access request; and based on detecting that the one or more validator nodes have properly validated the access request, allocating an additional set of authorization tokens to the one or more validator nodes.

In some embodiments, validating the access request via the validator nodes comprises detecting that the authorization level of the submitter node is above a defined threshold; and granting the access request.

In some embodiments, validating the access request via the validator nodes comprises detecting that the authorization levels of the one or more validator nodes are above a defined threshold; and granting the access request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
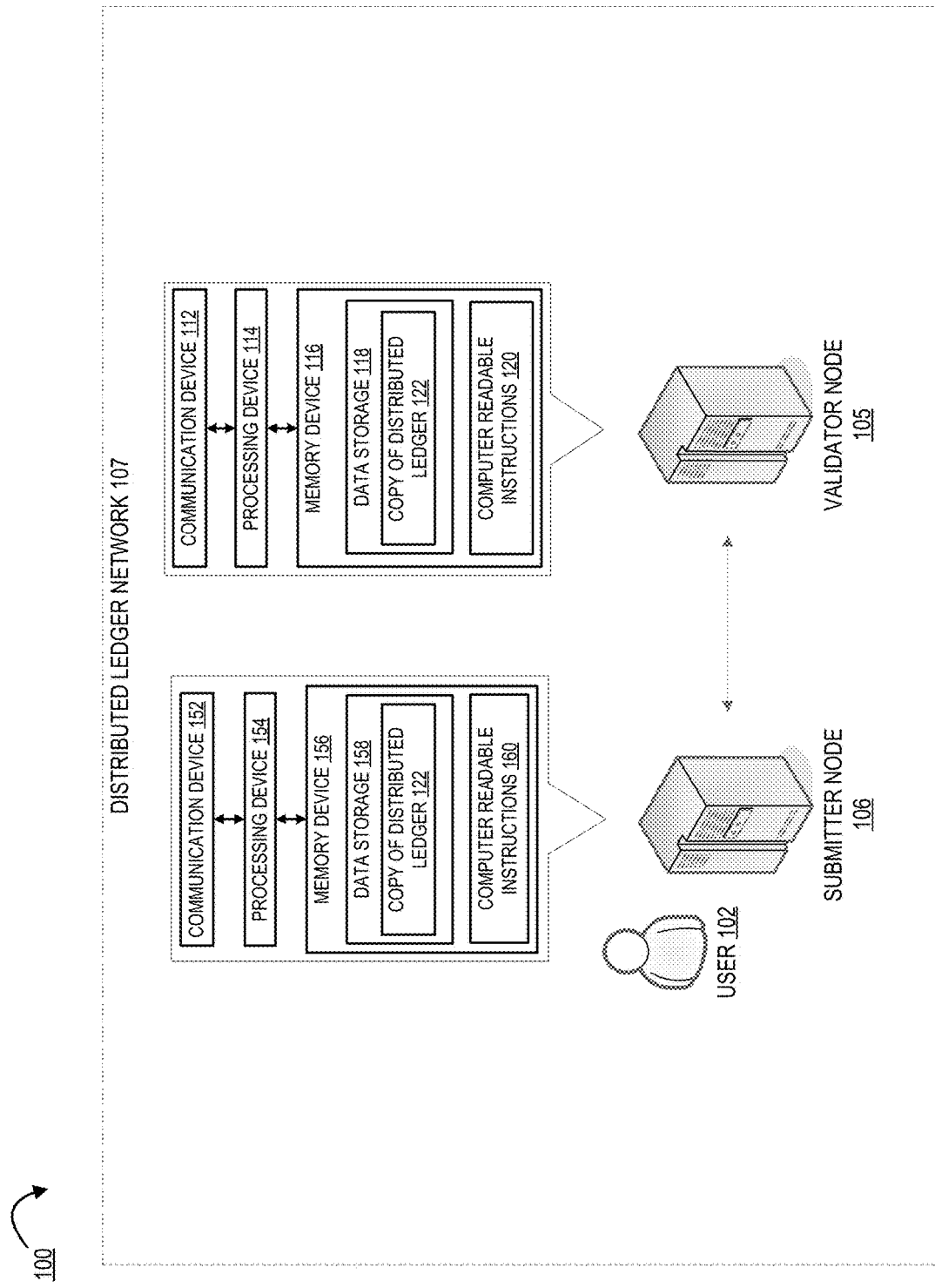
Figure 2:
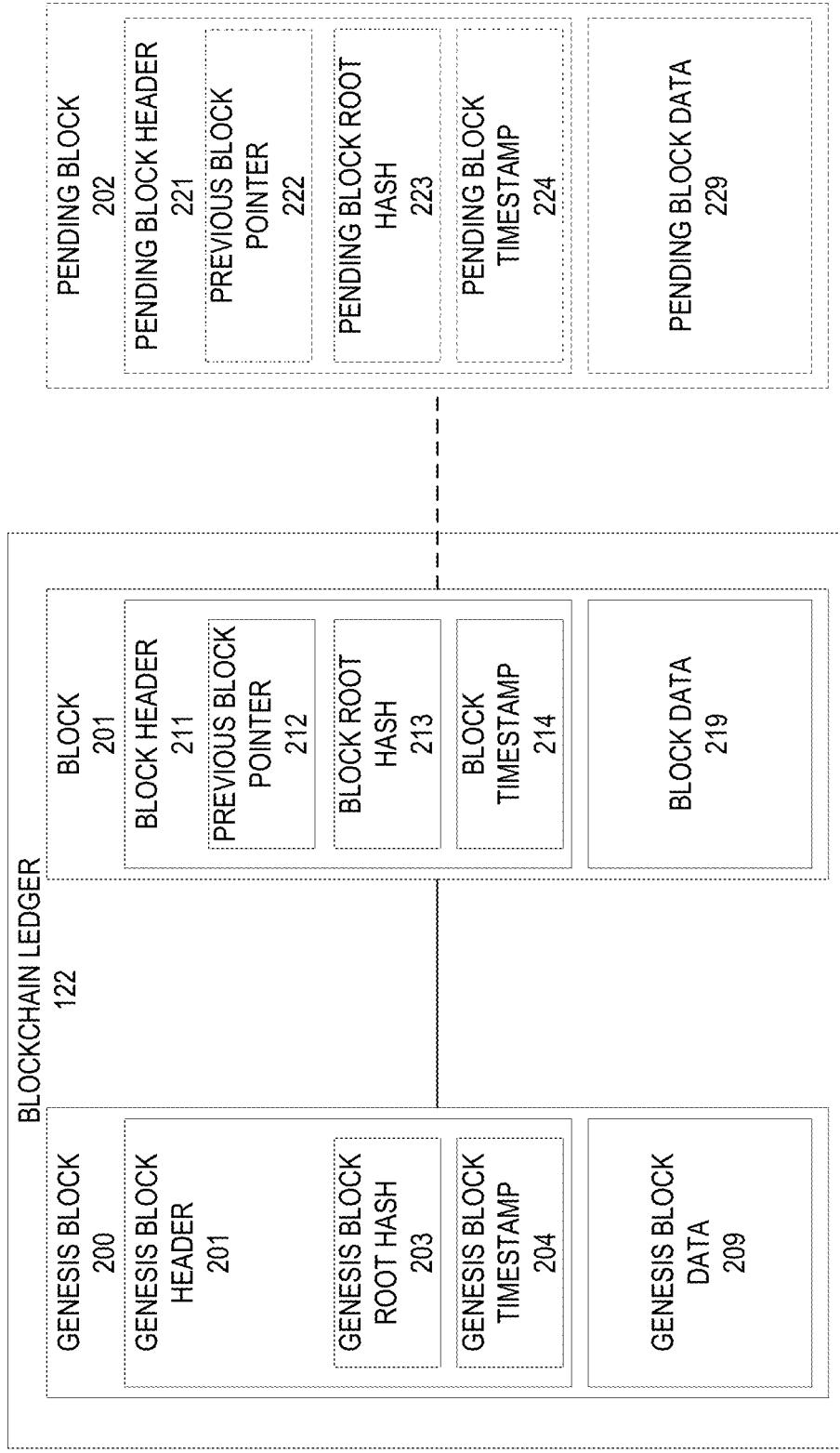

Having thus described embodiments of the invention in general terms, reference will now be made to the accompanying drawings, wherein:

FIG. 1 illustrates an operating environment for the distributed server authorization system, in accordance with one embodiment of the present disclosure;

FIG. 2 is a block diagram illustrating the data structures within an exemplary blockchain distributed ledger, in accordance with one embodiment of the present disclosure; and FIG. 3 illustrates a process flow for the distributed server authorization system, in accordance with one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed ledger," or "distributed electronic ledger" as used herein may refer to a structured list of data records that is decentralized and distributed amongst a plurality of computing systems and/or devices. In some embodiments, the distributed ledger may be a blockchain ledger.

"Blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the blockchain. In this way, beginning from an originating block (e.g., a "genesis block"), each block in the blockchain is linked to another block via the pointers within the block headers. If the data or metadata within a particular block in the blockchain becomes corrupted or modified, the hash values found in the header of the affected block and/or the downstream blocks may become mismatched, thus allowing the system to detect that the data has been corrupted or modified.

A "blockchain ledger" may refer to a distributed ledger which uses blockchain data structures. Generally, a blockchain ledger is an "append only" ledger in which the data within each block within the blockchain may not be modified after the block is added to the blockchain; data may only be added in a new block to the end of the blockchain. In this way, the blockchain may provide a practically immutable ledger of data records over time.

"Permissioned blockchain" as used herein may refer to a blockchain ledger for which an access control mechanism is implemented such that only known, authorized users may take certain actions with respect to the blockchain ledger (e.g., add new data records, participate in the consensus mechanism, or the like). Accordingly, "unpermissioned blockchain" as used herein may refer to a blockchain ledger without an access control mechanism.

"Private blockchain" as used herein may refer to a blockchain ledger accessible only to users or devices that meet specific criteria (e.g., authorized users or devices of a certain entity or other organization). Accordingly, a "public blockchain" is a blockchain ledger accessible by any member or device in the public realm.

"Node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid blockchain such that certain nodes may store certain segments of the blockchain but not others.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Smart contract" as used herein may refer to executable computer code or logic that may be executed according to an agreement between parties upon the occurrence of a condition precedent (e.g., a triggering event such as the receipt of a proposed data record). In some embodiments, the smart contract may be self-executing code that is stored in the distributed ledger, where the self-executing code may be executed when the condition precedent is detected by the system on which the smart contract is stored.

Embodiments of the present disclosure provide a system for authorization of data access and processing functions within a distributed server network using a delegated proof-of-stake consensus mechanism. The system may comprise a distributed ledger network in which plurality of nodes host a distributed ledger which may comprise a list of data records regarding certain actions or processes executed within the system. For instance, the data records may relate to stored data files (e.g., documents, media, or the like), transactions, organizational changes, or the like. Each participant of the distributed ledger (e.g., a user, computing system, and/or node) may be assigned an "authorization level" which indicates a measure of authority or trust held by the participant. In this regard, the system may assign one or more authorization tokens (which also may be referred to herein as "trust tokens") to the various participants, where the number of trust tokens assigned to a participant may indicate the degree of trust that the system has in the participant. For instance, a node that has been shown to perform its functions (e.g., hosting the distributed ledger, properly validating data records, processing transactions, or the like) may progressively be assigned an increasing number of trust tokens over time. Likewise, a node which has been shown to be unreliable (e.g., prone to data corruption or compromise, performs faulty validation, or the like) will not be assigned trust tokens. In some embodiments, an unreliable node may have existing trust tokens deallocated or removed over time by the system.

As described above, the authorization levels of users and/or systems of the distributed ledger are associated with the number of trust tokens allocated to the users and/or systems, which may be referred to herein as "delegates." Accordingly, users and/or systems with a greater number of trust tokens may have a relatively higher authorization level, while users and/or systems with a lower number of trust tokens may have a relatively lower authorization level. In this regard, the system may require that certain actions or processes be proposed by a user and/or system with a threshold authorization level in order to be validated by other nodes of the distributed ledger (e.g., validator nodes). The actions or processes proposed by the user may include a transaction request, request for access to data stored in the distributed ledger, organizational changes related to an entity, or the like. In an exemplary embodiment, a system may submit a proposed data record to be added to the distributed ledger, where the proposed data record comprises information regarding a transaction. If the information in the proposed data record references a transaction above a certain amount, the system may require that the submitting node and/or the one or more validator nodes meet a defined threshold authorization level (e.g., the submitting node and/or the validator nodes have the requisite number of trust tokens).

The proposed data record may be validated by one or more nodes via a delegated proof-of-stake consensus mechanism. In this regard, the participants having a greater number of trust tokens may receive greater weighting in the validation process than those participants having fewer trust tokens. Once the proposed data record has been validated, the proposed data record may be appended to the distributed ledger. In some embodiments, the system may then verify that the validation was properly executed by the participants (e.g., the submitting node or user and/or the one or more validator nodes or users). Upon verifying that a certain number of validations were successfully completed, the system may assign additional trust tokens to the nodes participating in validation. In some embodiments, trust tokens may be assigned to users and/or systems by a designated participant or a pool of participants having a requisite number of trust tokens. In such embodiments, the system may automatically adjust the pool of participants in real time based on the trust tokens possessed by the participants, thereby dynamically shifting the delegate pool in response to changes in trust token counts across the nodes. In this way, the system may ensure that the most trusted users and/or systems within the network environment are performing and/or validating the actions and/or processes that are considered to be the most sensitive according to the entity.

The system as described herein confers a number of technological advantages over conventional methods of providing authorization of actions or processes. In particular, storing the distributed ledger across all of the nodes within the distributed ledger network allows for automatic real-time or near real-time synchronization of data records while providing additional layers of security against data tampering or corruption. Furthermore, by using the delegated proof-of-stake consensus algorithm as described herein, the system may reduce the chance of malicious or unintentional processes from being executed within the network environment.

Turning now to the figures, FIG. 1 illustrates an operating environment 100 for the distributed server authorization system, in accordance with one embodiment of the present disclosure. In particular, FIG. 1 illustrates a validator node 105 that is communicatively coupled with a submitter node 106. The validator node 105 and the submitter node 106 may be part of a distributed ledger system 107 in which each node 105, 106 maintains a copy of a distributed ledger as described herein. It should be understood that FIG. 1 illustrates only an exemplary embodiment of the operating environment 100, and it will be appreciated that one or more functions of the systems, devices, or servers as depicted in FIG. 1 may be combined into a single system, device, or server. For instance, although FIG. 1 depicts the submitter node 106 and the validator node 105 as separate computing systems, the functions of each may be executed on a single computing system. Furthermore, a single system, device, or server as depicted in FIG. 1 may represent multiple systems, devices, or servers. For instance, though FIG. 1 depicts a single submitter node 106 and a single validator node 105, the system may comprise multiple validator nodes and multiple submitter nodes which may each write data to and read data from the distributed ledger.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the validator node 105 may be, for example, a networked terminal, server, desktop computer, or the like, though it is within the scope of the disclosure for the validator node 105 to be a portable device such as a cellular phone, smart phone, smart device, personal data assistant (PDA), laptop, or the like. The validator node 105 may comprise a communication device 112, a processing device 114, and a memory device 116, where the processing device 114 is operatively coupled to the communication device 112 and the memory device 116. The processing device 114 uses the communication device 112 to communicate with the network and other devices on the network. As such, the communication device 112 generally comprises a modem, antennae, WiFi or Ethernet adapter, radio transceiver, or other device for communicating with other devices on the network.

The memory device 116 comprises computer-readable instructions 120 and data storage 118, where the data storage 118 may comprise a copy of a distributed ledger 122. The distributed ledger (and the copy of the distributed ledger 122) may comprise a series of data records relevant to the objectives of the entity. For instance, the distributed ledger may comprise a series of data records comprising various types of information, such as transaction data, confidential data, organizational data, or the like. The distributed ledger may further comprise executable code (e.g., smart contract logic) embedded within the distributed ledger. The smart contract logic may be executed by the various nodes and/or other computing systems within the network environment to automatically execute certain processes upon the occurrence of a preset condition.

As further illustrated in FIG. 1, the submitter node 106 may comprise a communication device 152, a processing device 154, and a memory device 156. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, communication devices may also include a communication interface device that may be connected by a hardwire connection to the resource distribution device. The interface device may comprise a connector such as a USB, SATA, PATA, SAS or other data connector for transmitting data to and from the respective computing system.

The processing device 154 is operatively coupled to the communication device 152 and the memory device 156. The processing device 154 uses the communication device 152 to communicate with the network and other devices on the network, such as, but not limited to the validator node 105. The communication device 152 generally comprises a modem, antennae, WiFi or Ethernet adapter, radio transceiver, or other device for communicating with other devices on the network.

In some embodiments, the submitter node 106 may be operated by a user 102. In some embodiments, the user 102 may be an agent or administrator of an entity. In this regard, the memory device 156 may have computer-readable instructions 160 stored thereon. In some embodiments, the memory device 156 may further include data storage 158 which may comprise a copy of the distributed ledger 122. The user 102 and/or the submitter node 106 may submit access requests to the validator node 105, where the access requests may comprise requests to access certain restricted data, process transactions, make configuration changes to the network environment, or the like.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user 102, may include any of a number of devices allowing the devices to receive data from a user 102, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

FIG. 2 is a block diagram illustrating the data structures within an exemplary blockchain distributed ledger, in accordance with some embodiments. In particular, FIG. 2 depicts a plurality of blocks 200, 201 within the blockchain ledger 122, in addition to a pending block 202 that has been submitted to be appended to the blockchain ledger 122. The blockchain ledger 122 may comprise a genesis block 200 that serves as the first block and origin for subsequent blocks in the blockchain ledger 122. The genesis block 200, like all other blocks within the blockchain ledger 122, comprise a block header 201 and block data 209. The genesis block data 209, or any other instances of block data within the blockchain ledger 122 (or any other distributed ledger) may contain one or more data records. For instance, block data may comprise software source code, authentication data, transaction data, documents or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the blockchain ledger 122. In some embodiments, the timestamp may be a Unix timestamp. In some embodiments, particularly in blockchains utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the blockchain. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (i.e., the genesis block 200) in the blockchain ledger 122, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the blockchain to pass the validation checks imposed by the consensus algorithm. Thus, the computational impracticability of altering data records in a blockchain in turn greatly reduces the chance of improper alteration of data records.

A pending block 202 or "proposed block" may be submitted for addition to the blockchain ledger 122. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the blockchain, produces a hash value that falls under a specified threshold value. For instance, the PoW algorithm may require that said hash value begins with a certain number of zeroes. Once said nonce value is determined by one of the nodes in the blockchain, the node may post the "solution" to the other nodes in the blockchain. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the blockchain ledger 122. A pending block timestamp 224 may also be added to signify the time at which the pending block 202 is added to the blockchain ledger 122.

In other embodiments, the consensus mechanism may be based on a total number of consensus inputs submitted by the nodes of the blockchain ledger 122, e.g., a PBFT consensus mechanism. Once a threshold number of consensus inputs to validate the pending block 202 has been reached, the pending block 202 may be appended to the blockchain ledger 122. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

FIG. 3 illustrates a process flow 300 for the distributed server authorization system, in accordance with one embodiment of the present disclosure. The process begins at block 301, where the system allocates one or more authorization tokens to one or more nodes of the distributed ledger. The authorization tokens may represent discrete units of reliability of the node (or user) in the context of the system. Nodes and/or users that have been assigned more authorization tokens may be considered to be more reliable than those nodes and/or users having fewer authorization tokens. For instance, a node may be considered reliable if the node maintains integrity of the data within the distributed ledger, reliably processes access requests and/or transactions, securely protects against data breach or corruption, or the like over time. Likewise, a user may be considered reliable if the user submits valid access requests, properly validates access requests, or the like over time. Accordingly, the system may assign an increasing number of authorization tokens to reliable nodes and/or users over time. Conversely, the system may prevent authorization tokens from being assigned to an unreliable node or user (e.g., prone to data corruption or breach, improperly validates access requests, performs malicious or erroneous actions or processes, or the like). In some embodiments, the systems may remove authorization tokens from unreliable nodes or users. In this regard, unreliable nodes and users below a certain threshold of authorization tokens may have reduced weight in validating access requests or may be prevented entirely from participating in the consensus mechanism.

The process continues to block 302, where the system determines, based on the one or more authorization tokens, an authorization level for each of the one or more nodes of the distributed ledger. A greater number of authorization tokens may cause an authorization level of a node to be higher, while a lower number of authorization tokens may cause the authorization level to be lower. In some embodiments, the system may set thresholds for authorization levels for performing certain actions within the network environment (e.g., validating or submitting access requests). For example, the system may require that the submitting node of an access request (e.g., a request to access sensitive data stored in the distributed ledger) meet a certain authorization level requirement. Accordingly, access requests submitted by nodes or users without the requisite authorization level may be automatically rejected by the system. Similarly, the system may require that validating nodes meet a certain authorization level requirement for validating certain access requests. The various access requests may have different authorization level requirements depending on the potential for negative impacts on the system in the event that the access request is improper. For instance, an access request that may potentially be dangerous for the system (e.g., a change in security standards used by the system) may require that the submitting node and/or the validating nodes have relatively higher authorization levels, whereas access requests that are more routine (e.g., a request to process transactions below a certain threshold) may require relatively lower authorization levels.

The process continues to block 303, where the system receives, from a submitter node, an access request for the distributed ledger. The access request may take the form of a proposed data record to be appended to the distributed ledger. In this regard, the access request may comprise a request to access user accounts, execute a transaction, retrieve protected data, change the configuration of the system (e.g., security standards, data storage policies, or the like), store data files in the distributed ledger, or the like. In this regard, in some embodiments, the system may comprise multiple distributed ledgers where each distributed ledger stores information regarding an action or class of actions (e.g., one distributed ledger related to access to computing systems, another distributed ledger related to transactions, and the like).

The process continues to block 304, where the system, based on an authorization level of the submitter node and/or an authorization level of one or more validator nodes, validates the access request via the validator nodes. Depending on the type of action requested in the access request, the system may impose authorization level requirements on the submitter node and/or the validator nodes. In this regard, the system may establish different authorization level requirements for different activities or classes of activities for the submitter node and/or the validator nodes. If the submitter node meets an authorization requirement for the submitter node and/or the validator node meets an authorization requirement for the validator node, the validation of the access request may succeed and the access request may be granted. However, if the submitter node does not meet the authorization requirement for the submitter node (e.g., is lacking the requisite number of authorization tokens) or the validator node does not meet the authorization requirement for the validator node, the validation may fail, causing the access request to be denied.

The process concludes at block 305, where the system, based on validating the access request, resolves the access request. As described above, resolving the access request may be dependent on the authorization levels of the submitting node and/or the validator nodes. In this regard, the system may dynamically adjust the allocation of trust tokens with respect to the various nodes based on the performance of the nodes. For example, if a submitter node has been shown, over a period of time, to consistently submit valid access requests, then additional trust tokens may be allocated to the submitter node. Similarly, if the validator node shows that it consistently performs proper validation of access requests, then additional trust tokens may be allocated to the validator node. On the other hand, improper submission of access requests, improper validation, or other activities or behaviors as described herein may result in trust tokens being removed. Accordingly, the system may grant the access request if the threshold of authorization levels for the submitter node and/or the validator nodes is met or exceeded; otherwise, the system may reject the access request. In this way, the system may ensure that only the most trusted systems and/or users within the network environment may take certain high-impact actions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for authorization of data access and processing functions within a distributed server network, the system comprising:
    a memory device with computer-readable program code stored thereon;
    a communication device; and
    a processing device operatively coupled to the memory device and the communication device, wherein the processing device is configured to execute the computer-readable program code to:
        allocate one or more authorization tokens to one or more nodes of a distributed ledger;

determine, based on the one or more authorization tokens, an authorization level for each of the one or more nodes of the distributed ledger, wherein the authorization level is based on number of authorization tokens allocated to the nodes;

receive, from a submitter node, an access request for the distributed ledger;

based on an authorization level of the submitter node or an authorization level of one or more validator nodes associated with the submitter node, validate the access request via the validator nodes using a delegated proof-of-stake consensus mechanism to determine whether the authorization level of the submitter node or an authorization level of the one or more validator nodes is above a defined threshold;

based on validating the access request, grant the access request when the authorization level is above the defined threshold and deny the access request when the authorization level is below the defined threshold;

detect that the access request is valid;

based on detecting that the access request is valid, allocate an additional set of authorization tokens to the submitter node;

detect that the access request is invalid;

based on detecting that the access request is invalid, deallocate the one or more authorization tokens form the submitter node;

detect that the one or more validator nodes have properly validated the access request;

based on detecting that the one or more validator nodes have properly validated the access request, allocate an additional set of authorization tokens to the one or more validator nodes;

detect that the one or more validator nodes have improperly validated the access request; and based on detecting that the one or more validator nodes have improperly validated the access request, deallocate the one or more authorization tokens to the one or more validator nodes.

2. A computer program product for authorization of data access and processing functions within a distributed server network, the computer program product comprising at least one non-transitory computer readable medium having computer-readable program code portions embodied therein, the computer-readable program code portions comprising executable code portions for:

allocating one or more authorization tokens to one or more nodes of a distributed ledger;

determining, based on the one or more authorization tokens, an authorization level for each of the one or more nodes of the distributed ledger, wherein the authorization level is based on number of authorization tokens allocated to the nodes;

receiving, from a submitter node, an access request for the distributed ledger;

based on an authorization level of the submitter node or an authorization level of one or more validator nodes associated with the submitter node, validate the access request via the validator nodes using a delegated proof-of-stake consensus mechanism to determine whether the authorization level of the submitter node or an authorization level of the one or more validator nodes is above a defined threshold;

based on validating the access request, grant the access request when the authorization level is above the defined threshold and deny the access request when the authorization level is below the defined threshold;

detect that the access request is valid;

based on detecting that the access request is valid, allocate an additional set of authorization tokens to the submitter node;

detect that the access request is invalid;

based on detecting that the access request is invalid, deallocate the one or more authorization tokens form the submitter node;

detect that the one or more validator nodes have properly validated the access request;

based on detecting that the one or more validator nodes have properly validated the access request, allocate an additional set of authorization tokens to the one or more validator nodes;

detect that the one or more validator nodes have improperly validated the access request; and based on detecting that the one or more validator nodes have improperly validated the access request, deallocate the one or more authorization tokens to the one or more validator nodes.

\* \* \* \* \*